United States Patent Office 3,752,881
Patented Aug. 14, 1973

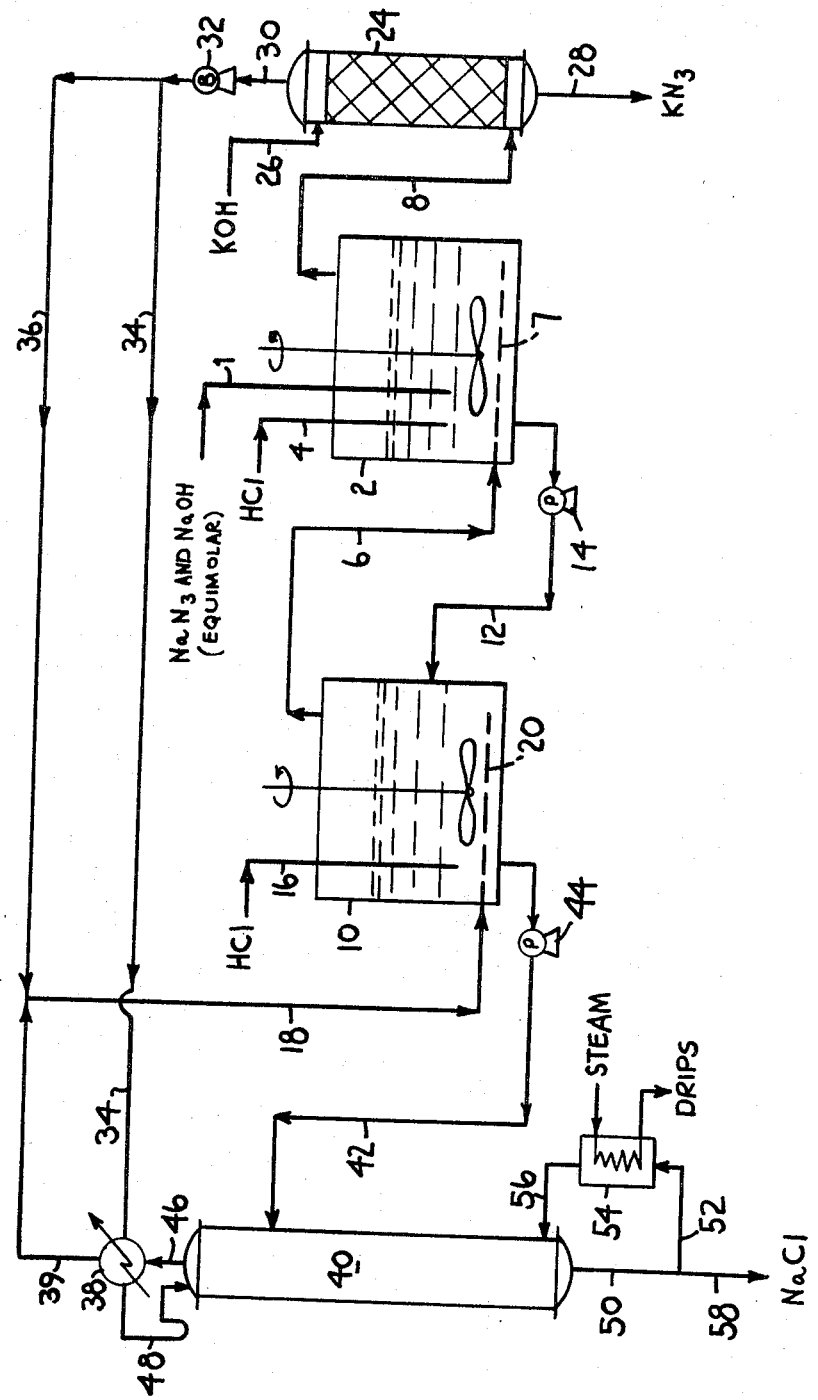

3,752,881
PROCESS FOR PRODUCTION OF AZIDES
William K. Snead, Wheeling, W. Va., assignor to PPG Industries, Inc., Pittsburgh, Pa.
Filed Nov. 24, 1970, Ser. No. 92,372
Int. Cl. C01b 21/08
U.S. Cl. 423—410  10 Claims

ABSTRACT OF THE DISCLOSURE

Hydrazoic acid is produced by acidifying alkali metal azide or alkaline earth metal azide. Hydrozoic acid dissolved in the by-product liquid resulting from the acidification is stripped and entrained in a flow of inert gas which removes the stripped hydrazoic acid vapor from the stripping system. The hydrazoic acid is contacted with a basic alkali metal or alkaline earth metal compound and the inert gas withdrawn and recycled to the process.

---

Hydrazoic acid is becoming of increasing importance, primarily as an intermediate in the preparation of various azide compounds such as its salts. Hydrazoic acid is bioactive and may be produced for those purposes. One particularly favorable use for hydrazoic acid is the preparation of alkali metal azide or alkaline earth metal azide by contacting the hydrazoic acid with the appropriate basic compound such as the hydroxide.

Hydrazoic acid may be prepared by several processes for which the basic chemistry is known. However, refinements must be made to the laboratory process employing the basic chemistry in order to achieve a commercially successful plant capable of producing sizable amounts of hydrazoic acid. One of the known laboratory methods for producing hydrazoic acid is the acidification of at least one alkali metal azide or alkaline earth metal azide with an acid such as one or more of the strong mineral acids. Such a process without further refinement is wasteful of both acid and azide values.

It is the purpose of this invention to achieve a more efficient utilization of acid and azide values in the production of hydrazoic acid by the acidification of at least one alkali metal azide or alkaline earth metal azide with a feed acid. This is accomplished by stripping dissolved hydrazoic acid from a solution of by-product salt of the feed acid to produce hydrazoic acid vapor and entraining the hydrazoic acid vapor in a flow of gas thereby removing it from the stripping system. Thereafter, the hydrazoic acid vapor so removed may be recovered. The principal component of the gas used to entrain the hydrazoic acid vapor is preferably an inert gas such as nitrogen, helium, argon, neon, xenon, krypton, air, methane, ethane, water vapor, $CF_4$, $CF_3Cl$ or mixtures of these. Recovery of the entrained hydrazoic acid vapor may be effected in several ways. One way is to use the hydrazoic acid vapor-inert gas mixture directly, as, for example, by treating stored produce with the mixture. Another way is to contact the mixture with the appropriate base to form salt of hydrazoic acid as more fully hereinafter explained. Still another method is to contact a solvent such as water with the mixture in order to form a solution of hydrazoic acid. The azide treated with feed acid, hereinafter called the feed azide, is usually sodium azide.

Any of the acids which are stable and more acidic than hydrazoic acids may be used as the feed acid. The strong mineral acids are ordinarily used. Exemplary mineral acids are hydrochloric acid, sulfuric acid, nitric acid, and orthophosphoric acid. Other acids such as acetic acid are suitable. Of course, gases such as hydrogen chloride, sulfur trioxide, or nitric oxide may be used if water is introduced elsewhere so as to form the acid in situ. Acidification may be by either batch process or continuous process.

The amount of feed acid employed may vary widely. If it is desired to convert only a portion of the feed azide to hydrazoic acid, the amount of feed acid used will be less than the stoichiometric amount. If substantially all of the feed azide is to be converted to hydrazoic acid, a stoichiometric amount or an excess of feed acid should be used. Of course, any basic impurities present in the feed azide should be accounted for in determining the amount of feed acid to use. Ordinarily enough acid is used to lower the pH of the reaction mixture to at least 6. A pH range of from about 1 to about 5 is typical. A range of about 2 to about 3 is preferred.

The reaction temperatuure may vary widely. The reaction is usually carried out at a temperature ranging from about 0° C. to about 100° C. A range of from about 40° C. to about 90° C. is typical. The preferred temperature range is from about 75° C. to about 80° C.

Atmospheric pressure is normally employed although higher or lower pressures may be used.

The basic principles of the present invention are illustrated by reference to the figure. The illustrated process shows the formation of hydrazoic acid by acidifying sodium azide with hydrochloric acid. The hydrazoic acid so produced is contacted with potassium hydroxide to produce potassium azide although the hydrazoic acid can be put to a number of other uses. Because sodium azide by the Wislicenus method produces one mole of sodium hydroxide for each mole of sodium azide produced, it is often convenient to acidify the mixture rather than separate the sodium hydroxide from the sodium azide before acidifying the sodium azide. If the sodium hydroxide is not removed, additional acid will be required to neutralize it when the sodium azide is acidified.

Referring now in more detail to the figure, equimolar portions of sodium azide and sodium hydroxide are fed through line 1 to mix tank 2 where they are contacted with hydrochloric acid introduced through line 4. A gas stream containing mostly nitrogen, a small percentage (usually about 3 percent) of hydrozoic acid, some water vapor, and some hydrogen chloride is introduced through line 6 and sparger 7 and bubbled through the mixture in mix tank 2 to dilute any hydrazoic acid formed and sweep it from the mix tank through line 8. Because hydrazoic acid is explosive in concentrated amounts, dilution by an inert gas such as nitrogen, helium, argon, neon, xenon, krypton, air, methane, ethane, water vapor, $CF_4$, $CF_3Cl$ or mixtures thereof is desirable to reduce the possibility of an explosion. The gas in line 8 advantageously contains about 5 to 8 percent hydrazoic acid. Greater or lesser proportions may be used if desired. Liquid from mix tank 2 having a pH of about 5 to 6 is forwarded to mix tank 10 through line 12 by pump 14. Hydrochloric acid is introduced through line 16 to lower the pH of the reaction mixture to about 2 to 3. Nitrogen containing small amounts of hydrazoic acid and water vapor is introduced through line 18 and sparger 20 to sweep hydrazoic acid from mix tank 10 through line 6 and into the mixture contained in mix tank 2. A gas stream including nitrogen, hydrazoic acid, and water vapor is passed through line 8 to scrubber 24 where it is contacted with aqueous potassium hydroxide introduced through line 26. The scrubber may be of any of many conventional designs such as, for example, a bubble cap column, sieve tray column, packed column, spray column, disc and donut column, or liquid filled column. Flow may be either countercurrent or parallel. In the figure a packed column utilizing countercurrent flow is shown. Potassium azide solution removed from scrubber 24 through line 28 may be used directly as an aqueous solution or it may be forwarded for further processing such as crystallization, drying and packaging. Nitrogen, some water vapor, and a small amount (on the order of about 1 percent) hydrazoic acid are removed from scrubber 24 through line 30 where they are forwarded by blower 32 to lines 34 and 36. Most of the gas leaving the scrubber 24 passes through line 36 to line 18 and thence into mix tank 10. A minor portion of the gas leaving scrubber 24 passes through line 34 through condenser 38 of stripping column 40, through line 39 and on to line 18 where it combines with the gas flow from line 36 for passage through the liquid in mix tank 10. It may be seen that nitrogen is recycled through mix tanks 2 and 10 and through scrubber 24 thereby containing most of the hydrazoic acid within the system. Make-up nitrogen may be added at any convenient location in the nitrogen system. Should there be any build-up of inert gases in the nitrogen system, the excess may be vented, preferably through a basic solution to neutralize any hydrazoic acid present. Liquid from mix tank 10 usually contains some dissolved hydrazoic acid which is often advantageously recovered. Stripping column 40 is suitable for this purpose. The stripping column itself is of conventional design and may conveniently be a bubble cap column, a sieve tray column, a packed column, or some similar device. Liquid from mix tank 10 is passed through line 42 by pump 44 and introduced to stripping column 40 at or near the top thereof. Vapor taken overhead is passed through line 46 to condenser 38. Condenser 38 is preferably run at total reflux. Reflux may be returned to stripping column through line 48. Nitrogen from line 34 is passed through condenser 38 where it entrains non-condensibles and hydrazoic acid and passes through lines 39 and 18 to mix tank 10. Bottoms, comprising principally sodium chloride solution, are removed from the stripping column through line 50 and split into two streams. One of these streams passes through line 52 to reboiler 54 where it is heated and returned to stripping column 40 through line 56. The other stream passes through line 58 for use or disposal of the by-product salt solution.

The above system for recovery of hydrazoic acid from a solution containing the by-product salt of the feed acid has been described with respect to a continuous process for producing hydrazoic acid but the principles are equally applicable to a batch process.

Although the detailed process for the production of hydrazoic acid which has been described has been incorporated into an over-all process for converting sodium azide into potassium azide using hydrazoic acid as an outstanding advantage. By varying the identities of the feed azide and the base fed to the scrubber, a large number of azides may be converted to other azides. Thus, an alkali metal azide may be converted into another alkali metal azide as shown in detail herein, alkali metal azide may be converted into alkaline earth metal azide, alkaline earth metal azide may be converted to alkali metal azide, and alkaline earth metal azide may be converted to another alkaline earth metal azide. Even the same azide as the feed azide may be regenerated by scrubbing with the appropriate base. Feed azides suitable for use in this invention include lithium azide, sodium azide, potassium magnesium azide, calcium azide, strontium azide, and barium azide. Of the alkali metal azides, sodium azide and potassium azide are most often used. Sodium azide is preferred. Of the alkaline earth metal azides, magnesium azide, calcium azide, strontium azide, and barium azide are most often used. Magnesium azide and calcium azide are preferred. Of course, mixtures of azides are suitable for use.

The base selected for feeding to the scrubber may be any soluble hydroxide or salt of the alkali metals or alkaline earth metals which will react to form the azide. Exemplary salts are the soluble carbonates such as sodium carbonate or potassium carbonate. Even slightly water-soluble compounds such as calcium carbonate or magnesium carbonate may be used. It is convenient to utilize a slurry of the slightly-soluble salts which react with hydrazoic acid in order to promote both mutual contact of the salt and hydrazoic acid and ease of handling. Examples of compounds suitable for feeding to the scrubber include lithium hydroxide, sodium hydroxide, potassium hydroxide, rubidium hydroxide, cesium hydroxide, magnesium hydroxide, calcium hydroxide, strontium hydroxide, barium hydroxide, dimethylberyllium (anhydrous solvent), diethylmagnesium (anhydrous solvent), magnesium carbonate and calcium carbonate.

While the invention has been described with reference to certain illustrative embodiments, it is not intended that it shall be limited thereby except insofar as appears in the accompanying claims.

What is claimed is:

1. A method of preparing a product azide selected from the group consisting of alkali metal azide and alkaline earth metal azide comprising:
    (a) contacting a feed azide selected from the group consisting of alkali metal azide and alkaline earth metal azide with a feed acid to generate hydrazoic acid vapor and to form a solution of by-product salt selected from the group consisting of alkali metal salt of said feed acid and alkaline earth metal salt of said feed acid, said solution also containing dissolved hydrazoic acid;
    (b) entraining hydrazoic acid vapor so generated in a flow of inert gas to dilute the hydrazoic acid vapor and to remove the hydrazoic acid vapor from the situs of its generation;
    (c) contacting a basic alkali metal compound or a basic alkaline earth metal compound with said generated hydrazoic acid vapor and said flow of inert gas to produce said product azide and a stream of said inert gas contaminated with hydrazoic acid vapor;
    (d) splitting said stream of inert gas contaminated with hydrazoic acid vapor into two substreams;
    (e) recycling the first of said substreams of inert gas contaminated with hydrazoic acid vapor to the situs where hydrazoic acid vapor is generated to entrain and dilute additional quantities of hydrazoic acid vapor;
    (f) introducing said solution to a stripping column at or near the top thereof;
    (g) supplying heat at or near the bottom of said stripping column to boil a portion of the bottoms;
    (h) removing bottoms product;
    (i) removing vapor from the top of said stripping column;
    (j) passing said removed vapor through condenser to form a condensate;
    (k) returning condensate to said stripping column as a reflux; and
    (l) passing the second of said substreams of inert gas contaminated with hydrazoic acid vapor through said condenser to entrain stripped hydrazoic acid vapor in said second substream and to remove said entrained hydrazoic acid vapor from said condenser.

2. The method of claim 1 wherein additional quantities of said basic alkali metal compound or said basic alkaline earth metal compound are contacted with said second substream and said entrained hydrazoic acid vapor removed from said condenser to produce additional quantities of said product azide.

3. The method of claim 1 wherein said second substream and said entrained hydrazoic acid vapor removed from said condenser are introduced to the situs where hydrazoic acid vapor is generated by acidification of said feed azide.

4. The method of claim 1 wherein said basic alkali metal compound is selected from the group consisting of alkali metal hydroxide and alkali metal carbonate and wherein said basic alkaline earth metal compound is selected from the group consisting of alkaline earth metal hydroxide and alkaline earth metal carbonate.

5. The method of claim 1 wherein all of said condensate is returned to said stripping column as reflux.

6. A method for preparing potassium azide comprising:
   (a) contacting sodium azide with a feed acid to generate hydrazoic acid vapor and to form a solution of by-product sodium salt of said feed acid, said solution also containing dissolved hydrazoic acid;
   (b) entraining hydrazoic acid vapor so generated in a flow of inert gas to dilute the hydrazoic acid vapor and to remove the hydrazoic acid vapor from the situs of its generation;
   (c) contacting potassium hydroxide with said generated hydrazoic acid vapor and said flow of inert gas to produce said potassium azide and a stream of inert gas contaminated with hydrazoic acid vapor;
   (d) splitting said stream of inert gas contaminated with hydrazoic acid vapor into two substreams;
   (e) recycling the first of said substreams of inert gas contaminated with hydrazoic acid vapor to the situs where hydrazoic acid vapor is generated to entrain and dilute additional quantities of hydrazoic acid vapor;
   (f) introducing said solution to a stripping column at or near the top thereof;
   (g) supplying heat at or near the bottom of said stripping column to boil a portion of the bottoms;
   (h) removing bottoms product;
   (i) removing vapor from the top of said stripping column;
   (j) passing said removed vapor through a condenser to form a condensate;
   (k) returning condensate to said stripping column as a reflux;
   (l) passing the second of said substreams of inert gas contaminated with hydrazoic acid vapor through said condenser to entrain stripped hydrazoic acid vapor in said second substream and to remove said entrained hydrazoic acid vapor from said condenser; and
   (m) introducing said second substream and said entrained hydrazoic acid vapor removed from said condenser to the situs where hydrazoic acid vapor is generated by acidification of said sodium azide.

7. The method of claim 6 wherein all of said condensate is returned to said stripping column as reflux.

8. The method of claim 6 wherein said feed acid is selected from the group consisting of hydrochloric acid, sulfuric acid, and orthophosphoric acid.

9. The method of claim 6 wherein said inert gas is air.

10. The method claim 6 wherein said inert gas is nitrogen.

References Cited
UNITED STATES PATENTS 3,309,295   3/1967   Cohn et al. ........... 203—49

FOREIGN PATENTS 938,720   10/1948   France ............... 23—101
435,654   10/1926   Germany ............. 23—157

OTHER REFERENCES

Walker et al., Principles of Chemical Engineering," 3rd ed., McGraw Hill Book Co., N.Y., 1937, pp. 545–53.

Reitzner, Bruno, et al., Picatinny Arsenal Technical Memorandum 1186, Dover, N.J., 1963.

Audrieth, L. F., "Chemical Reviews," vol. 15, 1934, p. 180.

GEORGE O. PETERS, Primary Examiner

U.S. Cl. X.R.

423—406